United States Patent [19]

Manico

[11] Patent Number: 5,627,016
[45] Date of Patent: May 6, 1997

[54] METHOD AND APPARATUS FOR PHOTOFINISHING PHOTOSENSITIVE FILM

[75] Inventor: Joseph A. Manico, Rochester, N.Y.

[73] Assignee: Eastman Kodak Company, Rochester, N.Y.

[21] Appl. No.: 608,828

[22] Filed: Feb. 29, 1996

[51] Int. Cl.$^6$ ................................................. G03C 5/00
[52] U.S. Cl. ................................. 430/434; 430/510
[58] Field of Search .................................. 430/434, 510

[56] References Cited

U.S. PATENT DOCUMENTS

| | | | |
|---|---|---|---|
| 3,378,633 | 4/1968 | Macovski | 358/331 |
| 3,586,434 | 6/1971 | Mueller | 355/2 |
| 3,609,010 | 9/1971 | Mueller | 359/559 |
| 4,309,100 | 1/1982 | Bendoni et al. | 354/303 |
| 4,375,324 | 3/1983 | Holmes | 354/303 |
| 4,445,770 | 5/1984 | Morse | 354/303 |
| 4,537,485 | 8/1985 | Saito | 354/303 |
| 4,540,263 | 9/1985 | Kramer | 354/304 |
| 4,630,915 | 12/1986 | Whiteside et al. | 354/275 |
| 4,645,323 | 2/1987 | Stella | 354/303 |
| 4,689,696 | 8/1987 | Plummer | 358/333 |
| 5,439,186 | 8/1995 | Merle et al. | 242/348.1 |

OTHER PUBLICATIONS

Samuel H. Liggero et al, "The Polaroid 35mm Instant Slide System", Journal of Imaging Technology, vol. 10, No. 1, Feb. 1984.

Primary Examiner—Hoa Van Le
Attorney, Agent, or Firm—Frank Pincelli

[57] ABSTRACT

A photofinishing system and method of photofinishing. The system includes a film cartridge having a strip of photosensitive film contained therein. The strip of photosensitive film comprising a support web having a back side and a front side, an emulsion layer provided on the back side of the strip of photosensitive film, and a filter array on the front side of the strip of photosensitive material of film. The system further includes a developing apparatus for developing exposed images on the strip of photosensitive film provided in the film cartridge. The developing apparatus includes holding chamber for holding and retaining the thrust film cartridge; a removal mechanism for removing the strip of film out of the cartridge; an application mechanism for applying an activator solution on the strip of photosensitive film after the film has been removed out of the film cartridge. A donor web assembly is provided which includes a supply reel having a hub around which the donor web is wound and a take-up reel for winding of the donor web from the supply reel; an activator solution supply; retrieval mechanism takes the activator solution from the activator solution supply and applies a coating of the solution on the donor web prior to the transfer section. A mechanism is provided for bringing into contact the side of the donor web having the coating into direct contact with the emulsion layer on the film.

5 Claims, 5 Drawing Sheets

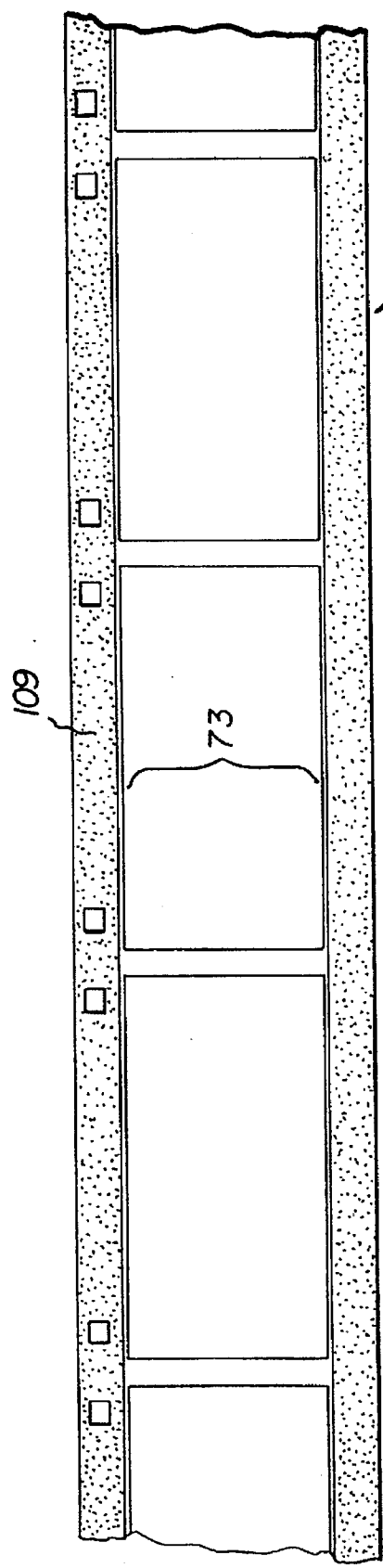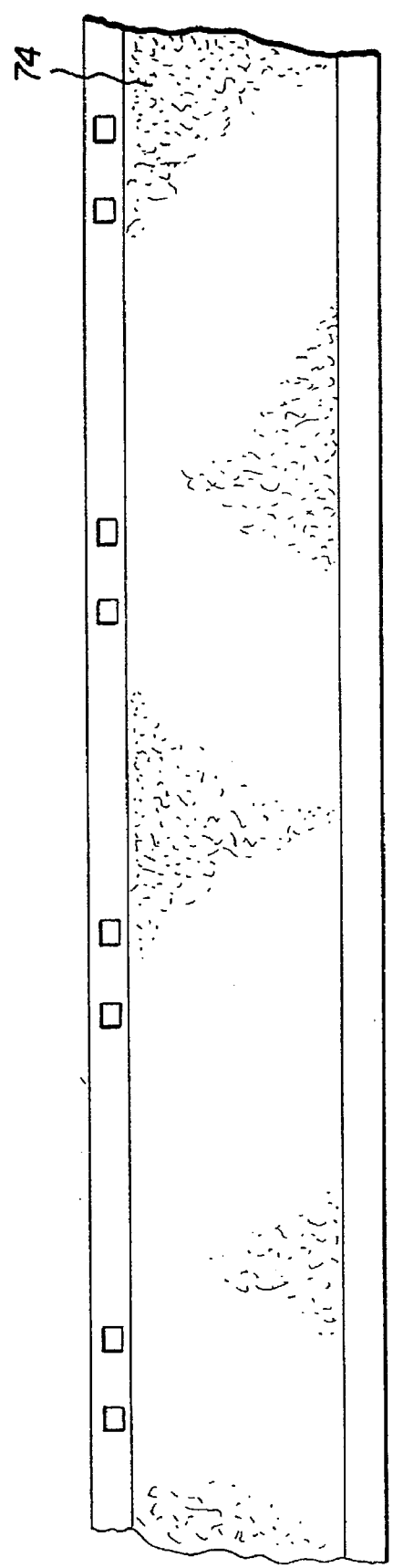
Fig. 5a
Fig. 5b

METHOD AND APPARATUS FOR PHOTOFINISHING PHOTOSENSITIVE FILM

FIELD OF THE INVENTION

The present invention relates to photofinishing of photosensitive material, and more particularly, to a method and apparatus for photofinishing a photosensitive material utilizing a Bi-Mat system.

BACKGROUND OF THE INVENTION

Typical photofinishing of photosensitive film comprises a conventional wet process involving a plurality of processing tanks, each containing a processing solution in which the film is successively passed. Such conventional wet processing is relatively expensive, relatively time-consuming, and must be carefully monitored and maintained in order to ensure consistent high quality.

There has been suggested in the prior art a Bi-Mat system whereby 35 mm instant color slide film is developed. An example of such system is the PolaChrome CS 35 mm Instant Color Slide Film which incorporates a black and white emulsion layer provided on a substrate and an additive color screen which is used to produce color images. Once the film has been exposed, it is placed in a device whereby a donor strip is coated with a processing solution which is then caused to come in contact with the exposed film through the use of a pair of laminating rollers. Since the emulsion is a black and white emulsion, only a single processing solution is applied. A problem with this system is that it sacrifices film speed, D-min density, and image quality in order to obtain visually acceptable slide images.

There has also been suggested in the prior art the providing of a fully automated photofinishing device wherein a customer can walk up to the device, insert a cartridge, and have processed film shortly thereafter. An example of such system is disclosed in U.S. Pat. No. 5,113,351 wherein a conventional wet processing system is utilized. This type of wet processing system requires care and maintenance of the chemistry in order to ensure consistent high quality.

The present invention provides a method and apparatus for photofinishing photosensitive material which is relatively simple and low cost. Additionally, the system does not require typical wet processing tanks, thereby minimizing the amount of maintenance and care required of the conventional chemistry in photofinishing and is also very rapid.

SUMMARY OF THE INVENTION

In one aspect of the invention there is provided a photofinishing system comprising: a film cartridge having a strip of photosensitive film contained therein and a developing apparatus for developing exposed images on the strip of photosensitive film provided in the film cartridge. The strip of photosensitive film comprising a support web having a back side and a front side, an emulsion layer provided on the back side of the strip of photosensitive film, and a filter array on the front side of the strip of photosensitive material of film. The developing apparatus comprising: holding means for holding and retaining the thrust film cartridge; means for removing the strip of film out of the cartridge; application means for applying an activator solution on the strip of photosensitive film after the film has been removed out of the film cartridge, the means comprising a donor web assembly which includes a supply reel having a hub around which the donor web is wound and a take-up reel for winding of the donor web from the supply reel; an activator solution supply; retrieval means for taking the activator solution from the activator solution supply and applying a coating of the solution on the donor web prior to the transfer section; means for bringing into contact the side of the donor web having the coating into direct contact with the emulsion layer on the film; and a digital scanner for scanning images developed in the emulsion layer.

In another aspect of the invention there is provided an automated photofinishing apparatus for photofinishing a strip of photosensitive film contained in a thrust film cartridge, the strip of photosensitive film comprising a support web having a top side and a front side, an emulsion layer provided on the back side of the strip of photosensitive film, and a filter array on the front side of the strip of photosensitive material of film. The apparatus comprising: a customer interface for supplying customer order information to the apparatus; holding means for holding and retaining the thrust film cartridge; means for thrusting the strip of film out of the cartridge; application means for applying an activator solution on the strip of photosensitive film after the film has been removed out of the thrust film cartridge, the means comprising a donor web assembly which includes a supply reel having a hub around which the donor web is wound and a take-up reel for winding of the donor web from the supply reel; an activator solution supply; retrieval means for taking the activator solution from the activator solution supply and applying a coating of the solution on the donor web prior to the transfer section; means for bringing into contact the side of the donor web having the coating into direct contact with the emulsion layer on the film; a digital scanner for scanning images developed in the emulsion layer; a printer for printing images scanned by scanner; and delivery means for returning the film and delivering the prints made by the printer to the customer.

In still another aspect of the present invention there is provided a method for developing a strip of photosensitive film provided in a thrust type film cartridge, the strip of photosensitive film comprising a support web having a back side and a front side, an emulsion layer on the back side, and a filter array on the front side, comprising the steps of:

thrusting the filmstrip out of the thrust film cartridge;

applying a developing activator on the emulsion layer so as to develop any exposed images present on the strip of film;

scanning the strip of film after the images have been developed; and thrusting the film back into the cartridge.

These and other advantages of the present invention will be more clearly understood and appreciated from a review of the following detailed description and appended claims, and by reference to the accompanying drawings.

DESCRIPTION OF THE DRAWINGS

FIG. 5a is a top plan view of a photographic film for use in the apparatus of FIG. 2;

FIG. 5b is similar to FIG. 5a illustrating the processing solution applied to the film;

DETAILED DESCRIPTION OF THE INVENTION

Figure 1:
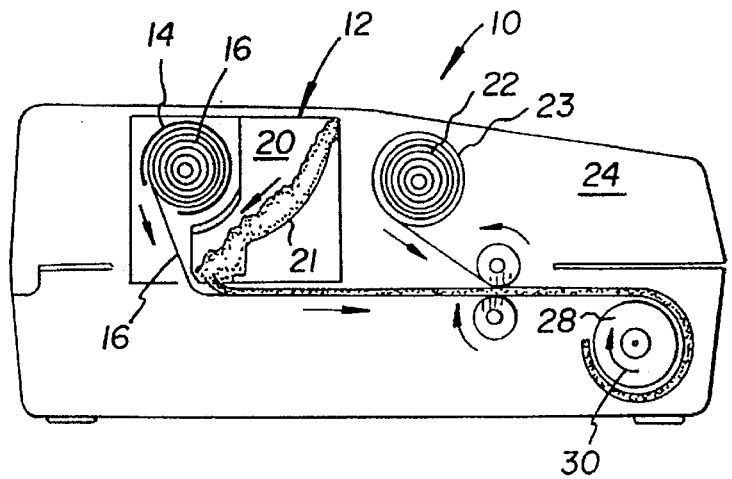
FIG. 1 is a cross-sectional view of a prior art Bi-Mat photofinishing apparatus.

Referring to FIG. 1, there is illustrated a prior art apparatus 10 wherein a Bi-Mat film can be processed. In particular, FIG. 1 illustrates schematically the interior of the apparatus 10 which includes a supply section 12 having a supply reel 14 containing a donor web 16 and a reservoir 20 containing a processing solution 21. A roll of exposed film 22 is provided internally of the apparatus in a light-tight compartment 24. The donor web 16 passes through a pair of laminating rollers 26 into a take-up reel 28. The exposed film 22 is also taken up along with the donor roller onto take-up reel 28. The take-up reel 28 is appropriately rotated in the direction indicated by arrow 30 which causes the donor web 16 to be unwound from supply reel 14 and unwinds the exposed film 22 from film cartridge 23. As the donor web 16 is being unwound, processing solution 21 is applied to the donor web 16 such that when the donor web 16 is passed through laminating rollers 26, the processing solution 21 will come in direct contact with the emulsion side of the exposed film 22. This causes the emulsion on the exposed film 22 to be developed. After development has occurred for the predetermined required time period, the film is rewound back into the film cartridge 23 and taken out of the apparatus 10.

The film 22, in the embodiment illustrated, comprises a black and white emulsion layer placed on a supporting substrate and an additive color screen provided on the other side of the supporting substrate such that when light is exposed onto the film, a latent color image is obtained.

The foregoing system has many disadvantages. The prior art system requires substantial manual manipulation. Additionally the process is not able to produce high quality images, particularly with low speed films, and does not have any ability to make any corrections or adjustments to the processing system.

Figure 2:
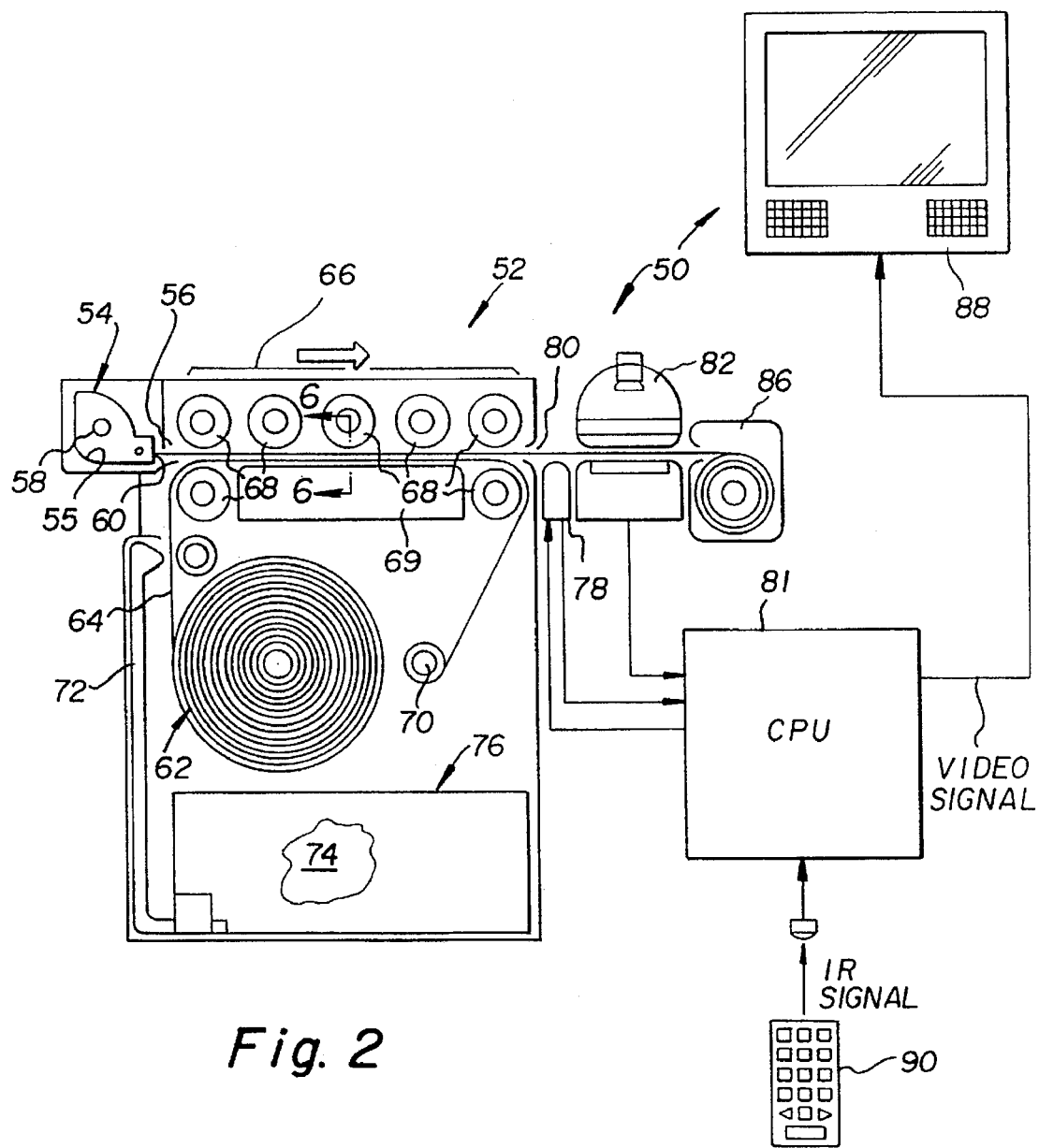
FIG. 2 is a schematic illustration of a photofinishing system made in accordance with the present invention.

Referring to FIG. 2, there is illustrated schematically a photofinishing system 50 made in accordance with the present invention. The photofinishing system 50 includes a developing apparatus 52 which incorporates a Bi-Mat developing system. For the purposes of this invention, a Bi-Mat developing system shall be considered a system which utilizes a single processing solution to fully develop the emulsion layer on the film 56 (see FIG. 5). The apparatus 52 includes holding means for holding and receiving film cartridge 54. In the particular embodiment illustrated, a receiving chamber 55 is provided having an interior configuration which substantially matches the outer shape of the cartridge 54. In the preferred embodiment illustrated, the film cartridge 54 is of the thrust film type, such as illustrated in U.S. Pat. Nos. 5,200,777 and 5,031,852, whereby the film can be automatically thrust out of or back into the film cartridge. These patents are hereby incorporated by reference in their entirety. The film cartridge 54 contains a strip of photosensitive film 56 helically wound about a film core 58 which is rotatably mounted to the cartridge 54. A light valve 60 is provided for allowing the strip of photosensitive film 56 to be either thrust out of or thrust back into the cartridge 54 by rotation of the core 58 in the appropriate direction. In the preferred embodiment illustrated, rotation of the core 58 is effectuated by a bi-directional rotary motor (not shown) which engages the core 58.

The developing apparatus 52 includes a supply reel 62 having a donor web 64 wound thereon. The donor web 64 is unwound from supply reel 62 and passed through developing section 66 by a motor (not shown) which drives take-up reel 70 which receives the donor web. A plurality of guide rollers 68 guide the donor web 64 and strip of photosensitive film 56 through the developing section and apply a force against backer member 69 such that the edges of the strip of photosensitive material 56 outside of the image area will be forced together which will cause developer solution on the donor web 64 to intimately contact the emulsion layer confined to the image area 73 as best seen by reference to FIG. 6. This can be accomplished by removing the area 71 of the roller 68 in the image area. Take-up reel 70 takes-up the donor web 64 after it has passed through the developing section 66. A applicator 72 is provided for drawing processing/activator solution 74 contained in reservoir 76 and applying the processing solution 74 onto the donor web 64 as it is being payed out for delivery to the developing section 66.

A magnetic read/write head 78 is provided adjacent the exit 80 of the delveloping section 66 which is capable of reading and/or writing magnetic information on a magnetic media provided in the form of a strip or layer on the film 56. Directly adjacent the magnetic read/write head 78, there is provided a scanner 82 for reading of the image that has been developed on the film 56. The scanner 82 is preferably a high resolution digital image scanner, for example, but not limited to, a CCD array (charge coupled device) which can scan the image and thereby produce a digital record of the image scanned. Phis information is then passed onto computer (CPU) 81 where the digital information is manipulated as appropriate. Festoon 86 is provided for taking up of the film 56 as it is passed by the scanner 82. In the embodiment illustrated, the digital image record obtained by scanner 82 is displayed on display device 88, which in the particular embodiment illustrated is a CRT tube. Thus, the operator can immediately see images that have been developed.

An input device 90 is provided for providing information to the CPU 81. In the particular embodiment illustrated, input device 90 is a keypad. Through the use of the input device 90, customer order selections can be made and recorded onto the magnetic media provided on the film for printing of images in a photographic printer. In the particular embodiment illustrated, the images are scanned at relatively low resolution so that the time taken to process the information by the CPU 81 can be quickly accomplished and displayed as soon as possible on the display device 88. However, if desired, a high resolution scan can be conducted for display. In addition to print order selections that can be inputted into input device 90, other various information can be entered into CPU 81, for example, but not limited to, information relating to printing of the order such as zoom, crop, number of copies, and any other corrections so desired that may be accomplished by the later photofinishing equipment. Additionally, film printing instructions can be passed onto a printer, such as the Eastman Kodak Clas 3 Printer or to a digital print system which includes a film scanner and digital CRT printer, whereby the magnetic information stored thereon can be used to control printing parameters.

Figure 3:
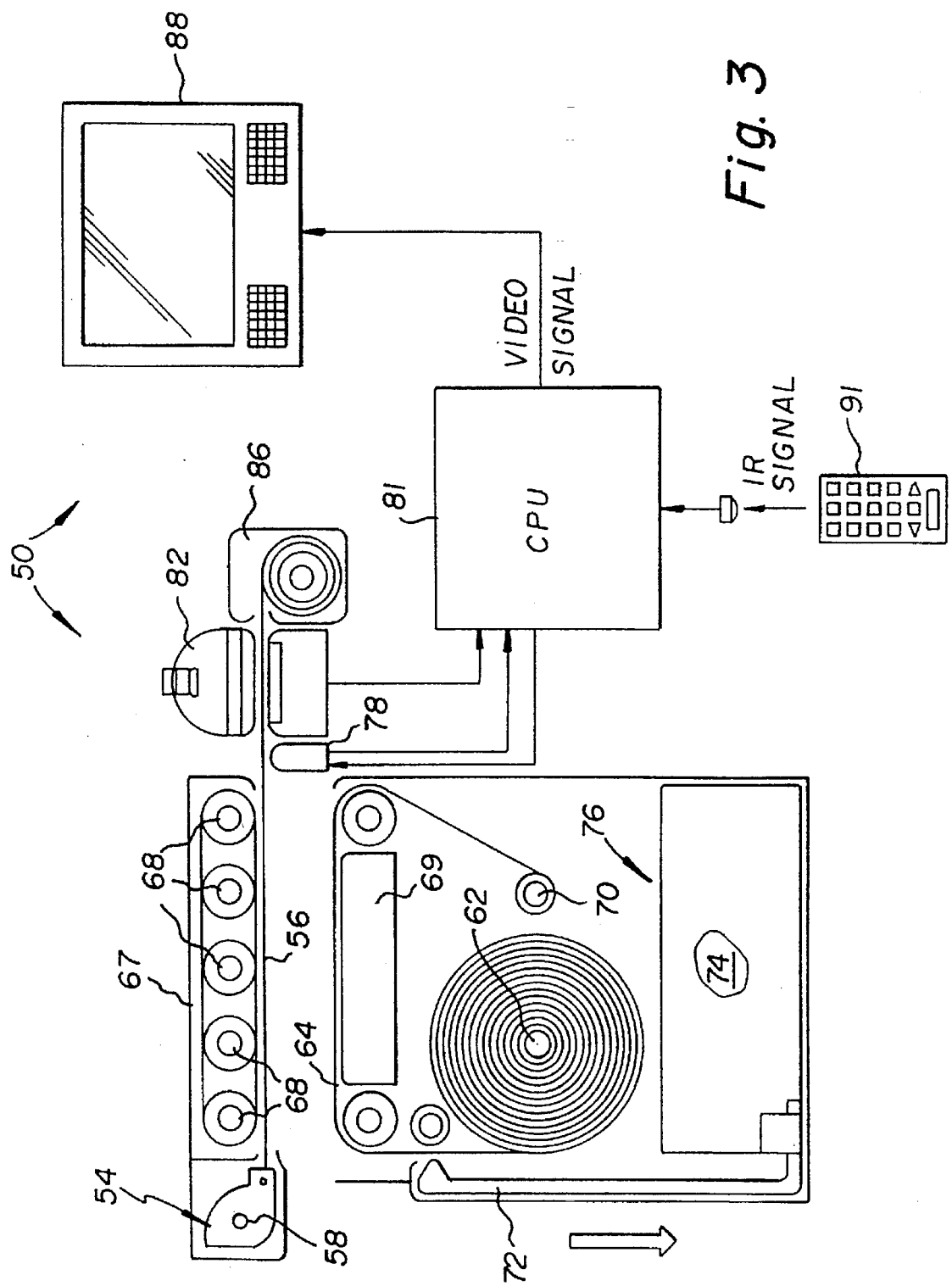
FIG. 3 is a view similar to FIG. 2 illustrating the apparatus in a second position allowing film to be returned to the film cartridge.
Figure 6A:
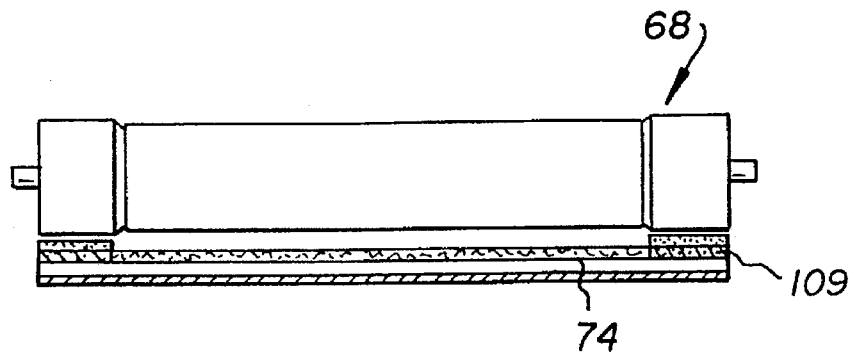
FIG. 6a is a enlarged cross-sectional view of the apparatus of FIG. 2 as taken along line 6—6 illustrating application of the processing solution.
Figure 6B:
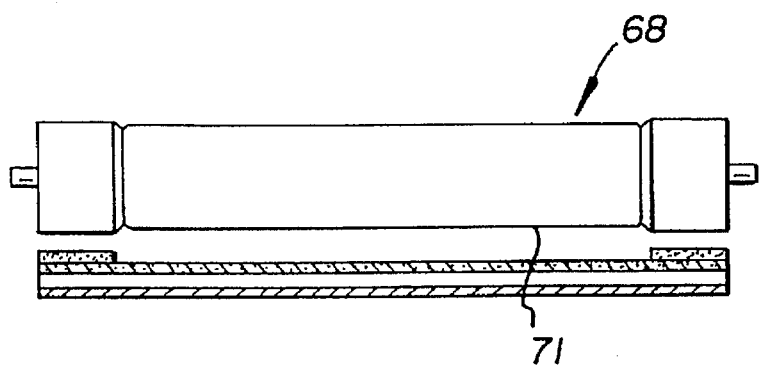
FIG. 6b is similar to FIG. 6a illustrating the development section disengaged from the film.

Referring to FIGS. 3 and 6a, there is illustrated apparatus 52 in the film return mode whereby film that has been scanned and temporarily placed into festoon 86 is returned to the cartridge 54. When the developing apparatus 52 is in this mode, the back portion 67 of the developing section 66 is moved away from the donor web 64 so that the film 56 during return will not come in contact with the donor web 64. After the film 56 has been fully returned to the film cartridge 54, the apparatus 52 can then be placed in the developing operation mode as illustrated in FIG. 2.

Figure 7:
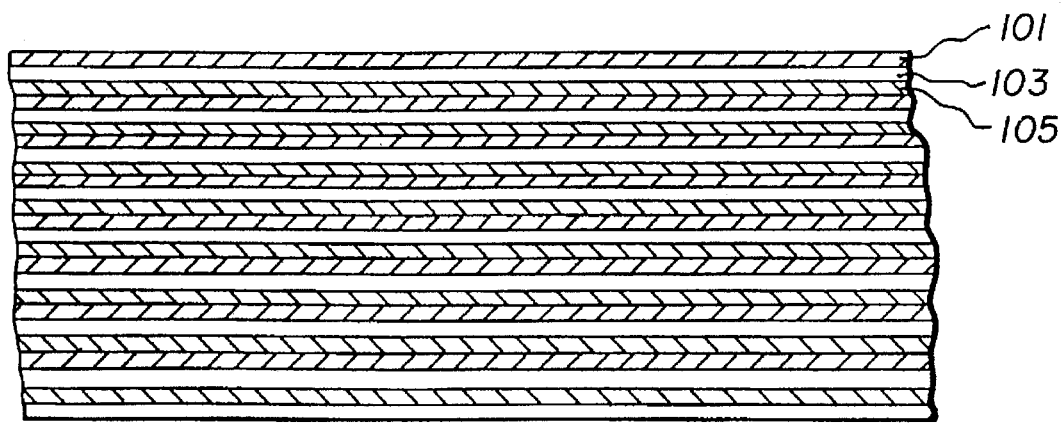
FIG. 7 is enlarged cross sectional view of the film of FIG. 5 as taken along line 7—7.

Referring to FIGS. 5a and 7, there is illustrated in greater detail a strip of photosensitive film 56 designed for use in the apparatus 52. Film 56 is provided with a supporting substrate 95 having a black and white emulsion layer 96 on one side (the back side) of substrate 95 and on the other side (the front side) there is provided a color filter array (CFA) 98. The use of front and back in describing the sides of the film has been provided for ease of description and was not intended to indicate a particular orientation. The color filter array 98 comprises a plurality of alternating very narrow strips 101,103,105 of red, green and blue filters that are placed thereon. However, it is to be understood that any color suitable filter array or pattern may be placed thereon. In the particular embodiment illustrated, the strips of red, green, and blue filters are approximately 400 sets per cm. It is, of course, to be understood that any appropriate color filter array may be used. In the preferred embodiment illustrated, the emulsion layer 96 is provided only in the image retaining area of the film 56. A strip 109 of magnetic media is provided on the same side as the emulsion layer 96 outside of the image area. The strip 109 is capable of retaining magnetic encoded information recorded thereon. FIG. 5b is similar to FIG. 5b except that in FIG. 5b illustrating the processing solution 74 on film 56.

In order to more fully understand the present invention, a brief description of its operation will now be discussed.

A film cartridge 54 containing a strip of exposed, but undeveloped film 56 is provided and placed in the apparatus 52. Appropriate mechanisms are activated for opening of the light valve 60 and for thrusting of the film out of the cartridge 54. At the same time, the appropriate mechanism is activated for moving of the donor web 64 from supply reel 62 through development section 66. At the same time, processing solution is drawn from the reservoir 76 and a thin layer of developing solution is applied to the surface of the donor web which will come in contact with the emulsion side of the film. As the emulsion on the film and donor web 64 passes through development section 66, pressure is applied by rollers 68 causing the emulsion side of the film to be forced against backing member 69 such that the processing solution will intimately contact the emulsion side of the film 56. The web 64 and film 56 are driven at such a speed so as to give appropriate time for the processing solution on the web 64 to come in contact with and develop the image thereon. By the time the film 56 reaches exit 80, the film 56 will have completed its processing. Thereafter, magnetic head 78 will read any appropriate information thereon and pass this information to the CPU 81. Additionally, as the film 56 passes the scanner 82, the image information will be digitally recorded and also supplied to the CPU 81. Thereafter, the digital information is appropriately displayed at the convenience of the user whereby appropriate selections are made. The customer order information can be written onto the film 56. This information can later be read by the printer from the film which will print the order in accordance with the instructions. Alternatively, the customer order information and/or printing instructions can be sent directly to the printer via communication link for placement in the printer memory so that when the printer receives and identifies the film the correct order instructions will be recalled and implemented.

Figure 4:
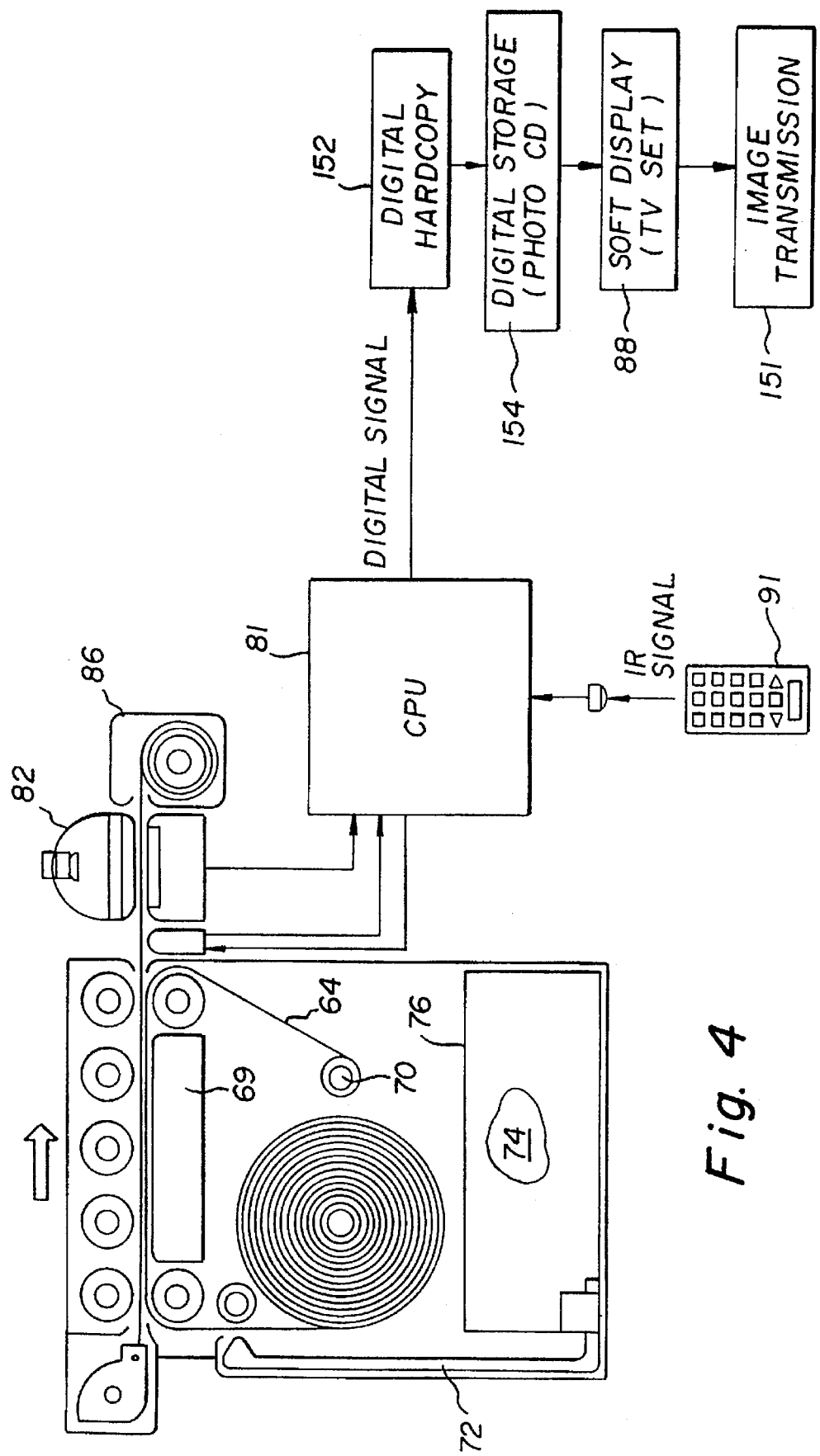
FIG. 4 is a schematic illustration of a modified system made in accordance with the present invention.

Referring to FIG. 4, there is illustrated a modified photofinishing system made in accordance with the present invention. The photofinishing system 150 is similar to photofinishing system 50, like numerals indicating like parts and operation. The difference in this embodiment is that instead of providing instructions for incorporating onto the film for later printing, the information is scanned by scanner 82 and is sent directly onto a digital imaging device. For example, the information can be sent onto a digital printer 152 and/or a digital storage device 154. In the particular embodiment illustrated, the digital storage device 154 is a PhotoCD and printer 152 is a digital CRT printer which exposes photosensitive material. Alternatively, information can be transmitted to a remote location for viewing or printing.

The embodiment of FIG. 4 is very useful in a stand-alone type photofinishing device as the system requires very little attention. The black and white emulsion is not as sensitive as color emulsions and, therefore, a processor for the film of the present invention would not require as much maintenance and control as a typical color prior art processor. A further advantage of the present invention is that the developing process is very quick thus allowing the completed order to be returned to the customer within a very short period of time, for example, within five minutes or less. Thus the system of figure can be provided in a single device such as an appropriate kiosk or customer service station which would further include appropriate means for controlling receipt of the film, customer selections, and later storage and delivery of the completed orders for pickup by the customer immediately or at some later time as is disclosed in U.S. Pat. No. 5,113,351 or EPO publication No. 0 234 833 which are both incorporated by reference herein.

In the preferred embodiment illustrated, a filmstrip containing black and white emulsion is used. However, if so desired, color emulsions may be used wherein a single developing process is required or can be utilized.

It is to be understood that various other changes and modifications may be made without departing from the scope of the present invention. The present invention being limited by the following claims.

Parts List

10 . . . apparatus
12 . . . supply section
14 . . . supply reel
16 . . . donor web
20 . . . reservoir
21 . . . processing solution
22 . . . exposed film
23 . . . cartridge
24 . . . light-tight compartment
26 . . . laminating rollers
28 . . . take-up reel
30 . . . arrow
50 . . . photofinishing system
52 . . . developing apparatus
54 . . . film cartridge
55 . . . receiving chamber
56 . . . photosensitive film
58 . . . film core
60 . . . light valve
62 . . . supply reel
64 . . . donor web
66 . . . developing section
67 . . . back portion
68 . . . guide rollers 69 . . . backer member
70 . . . take-up reel
71 . . . area
72 . . . applicator
73 . . . image area
74 . . . processing/activator solution
76 . . . reservoir
78 . . . magnetic read/write head
80 . . . exit
81 . . . computer (CPU)
82 . . . scanner
86 . . . festoon
88 . . . display device
90 . . . input device
95 . . . supporting substrate
96 . . . black and white emulsion layer
98 . . . color filter array (CFA)
101, 103, 105 . . . narrow strips of filters
109 . . . strip of magnetic media
150 . . . photofinishing system
152 . . . digital printer
154 . . . digital storage device

I claim:

1. A method for developing a strip of photosensitive film provided in a thrust type film cartridge, said strip of photosensitive film comprising a support web having a back side and a front side, an emulsion layer on said back side, and a filter array on said front side, comprising the steps of:

thrusting said filmstrip out of said thrust film cartridge;

applying a developing activator on said emulsion layer so as to develop any exposed images present on said strip of film;

scanning said strip of film after said images have been developed; and thrusting said film back into said cartridge.

2. A method for developing a strip of photosensitive film provided in a thrust type film cartridge, said strip of photosensitive film comprising a support web having a back side and a front side, an emulsion layer on said back side, and a filter array on said front side, comprising the steps of:

thrusting said filmstrip out of said thrust film cartridge;

applying a developing activator on said emulsion layer so as to develop any exposed images present on said strip of film;

scanning said strip of film after said images have been developed;

displaying images scanned by said scanner on a visual display device; and thrusting said film back into said cartridge.

3. The method according to claim 2 wherein said images are displayed at a low resolution.

4. The method according to claim 3 wherein the customer makes a print order selection based on the said low resolution display.

5. The method according to claim 2 wherein the print order selection is written on a magnetic media provided on said film.

* * * * *